US010416794B2

United States Patent
Shirai et al.

(10) Patent No.: US 10,416,794 B2
(45) Date of Patent: Sep. 17, 2019

(54) TOUCH PANEL FOR DETECTING INCLINATION OF STYLUS PEN BASED ON DIFFERENCE BETWEEN SENSOR DETECTION DATA

(71) Applicant: LINFINY CORPORATION, Taoyuan (TW)

(72) Inventors: Kazumichi Shirai, Tokyo (JP); Hiroyuki Kaneko, Tokyo (JP); Tsutomu Tomokiyo, Kanagawa (JP)

(73) Assignee: LINFINY CORPORATION, Taoyuan (TW)

( * ) Notice: Subject to any disclaimer, the term of this patent is extended or adjusted under 35 U.S.C. 154(b) by 0 days.

(21) Appl. No.: 15/550,575

(22) PCT Filed: Dec. 3, 2015

(86) PCT No.: PCT/JP2015/083959
§ 371 (c)(1),
(2) Date: Aug. 11, 2017

(87) PCT Pub. No.: WO2016/132627
PCT Pub. Date: Aug. 25, 2016

(65) Prior Publication Data
US 2018/0032155 A1 Feb. 1, 2018

(30) Foreign Application Priority Data
Feb. 18, 2015 (JP) .................................. 2015-029552

(51) Int. Cl.
*G06F 3/038* (2013.01)
*G06F 3/041* (2006.01)
(Continued)

(52) U.S. Cl.
CPC ........ *G06F 3/0383* (2013.01); *G06F 3/03545* (2013.01); *G06F 3/041* (2013.01); *G06F 3/046* (2013.01); *G06T 3/20* (2013.01)

(58) Field of Classification Search
CPC ..................................................... G06F 3/0383
(Continued)

(56) References Cited

U.S. PATENT DOCUMENTS

| 5,748,110 A | 5/1998 | Sekizawa et al. |
| 2011/0193776 A1* | 8/2011 | Oda .................. G06F 3/046 345/157 |

(Continued)

FOREIGN PATENT DOCUMENTS

| EP | 1333368 A2 | 8/2003 |
| JP | 08-022356 | 1/1996 |

(Continued)

OTHER PUBLICATIONS

Sep. 18, 2018, European Search Report issued for related EP application No. 15882728.7.

*Primary Examiner* — Long D Pham
(74) *Attorney, Agent, or Firm* — Paratus Law Group, PLLC

(57) ABSTRACT

There is provided an information processing device that can detect the inclination of an input device through a simple operation while preventing the input device from increasing in size, the information processing device including: a data acquisition unit configured to acquire, as detection data, output values or gains of a first sensor and a second sensor which are each capable of detecting contact with or approach to an input device; and an inclination detection unit configured to detect inclination of the input device on the basis of a difference value between the detection data of the first sensor and the detection data of the second sensor.

17 Claims, 18 Drawing Sheets

(51) Int. Cl.
*G06F 3/046* (2006.01)
*G06F 3/0354* (2013.01)
*G06T 3/20* (2006.01)

(58) Field of Classification Search
USPC .......................................... 345/179
See application file for complete search history.

(56) References Cited

U.S. PATENT DOCUMENTS

2011/0282624 A1* 11/2011 Hsieh ................. G01C 9/06
 702/154
2013/0321335 A1* 12/2013 Tokutake ............ G06F 3/044
 345/174
2014/0118291 A1* 5/2014 Fujii ................... G06F 3/0418
 345/174

FOREIGN PATENT DOCUMENTS

JP 10-105322 4/1998
JP 2014-092809 5/2014

\* cited by examiner

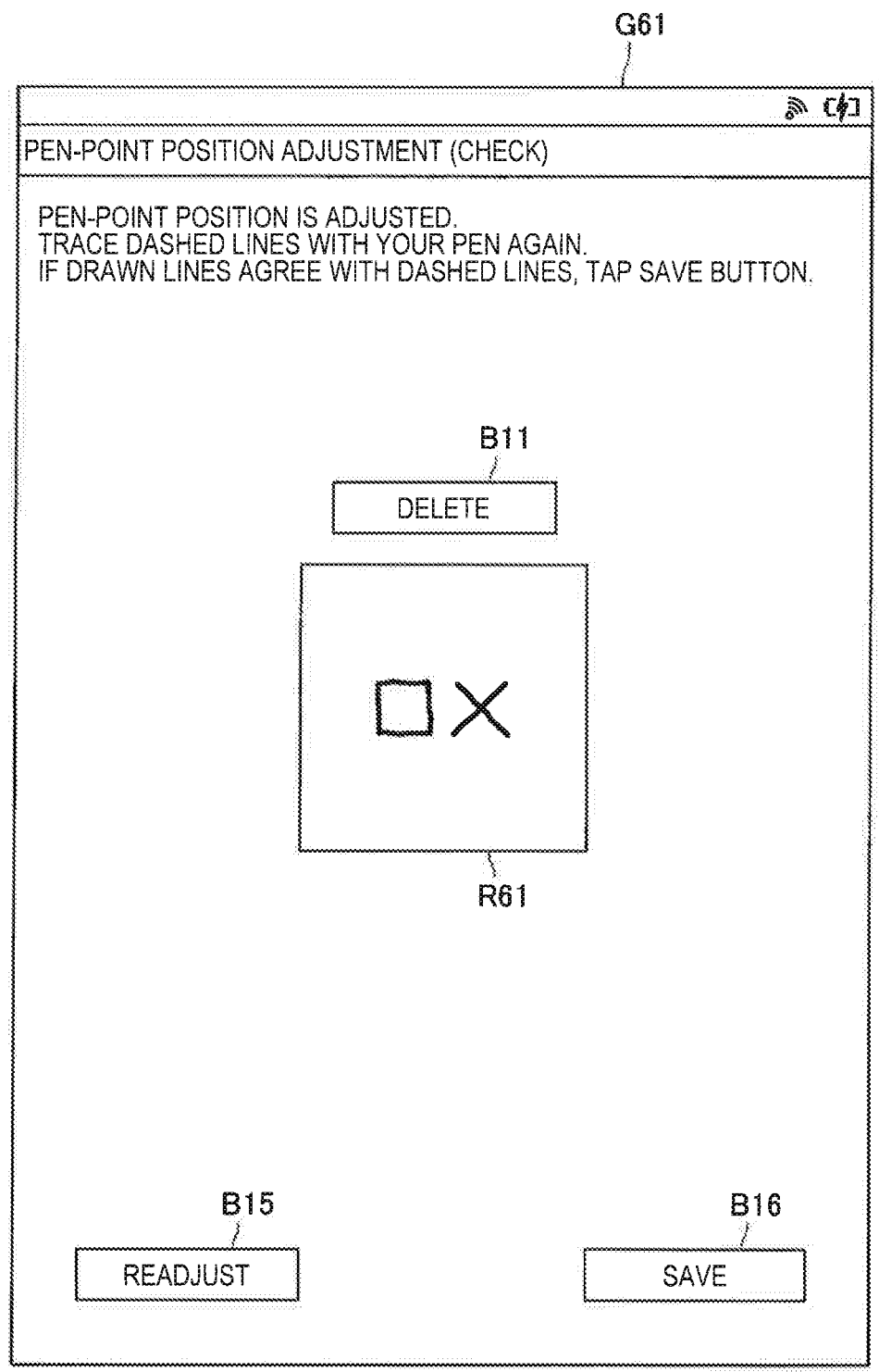

TOUCH PANEL FOR DETECTING INCLINATION OF STYLUS PEN BASED ON DIFFERENCE BETWEEN SENSOR DETECTION DATA

CROSS REFERENCE TO PRIOR APPLICATION

This application is a National Stage Patent Application of PCT International Patent Application No. PCT/JP2015/083959 (filed on Dec. 3, 2015) under 35 U.S.C. § 371, which claims priority to Japanese Patent Application No. 2015-029552 (filed on Feb. 18, 2015), which are all hereby incorporated by reference in their entirety.

TECHNICAL FIELD

The present disclosure relates to an information processing device and an information processing method.

BACKGROUND ART

The technology has been recently known of inputting positions on tablets with input devices such as stylus pens. Here, various kinds of technology are known as the technology of detecting the inclination of the input devices. Examples thereof include the technology of detecting the inclination of the input devices with sensors incorporated into the input devices. Further, the technology has been known of detecting the inclination of the input devices from the distribution of the induced voltages generated in tablets when the input devices come into contact with or approach the tablets (see, for example, Patent Literature 1).

CITATION LIST

Patent Literature

Patent Literature 1: JP H8-22356A

DISCLOSURE OF INVENTION

Technical Problem

It is, however, desired to provide technology that can detect the inclination of an input device through a simple operation while preventing the input device from increasing in size.

Solution to Problem

According to the present disclosure, there is provided an information processing device including: a data acquisition unit configured to acquire, as detection data, output values or gains of a first sensor and a second sensor which are each capable of detecting contact with or approach to an input device; and an inclination detection unit configured to detect inclination of the input device on the basis of a difference value between the detection data of the first sensor and the detection data of the second sensor.

According to the present disclosure, there is provided an information processing method including: acquiring, as detection data, output values or gains of a first sensor and a second sensor which are each capable of detecting contact with or approach to an input device; and detecting, by a processor, inclination of the input device on the basis of a difference value between the detection data of the first sensor and the detection data of the second sensor.

Advantageous Effects of Invention

As described above, according to the present disclosure, there is provided technology that can detect the inclination of an input device through a simple operation while preventing the input device from increasing in size. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 18 is a diagram illustrating an example of a readjustment screen.

MODE(S) FOR CARRYING OUT THE INVENTION

Figure 1:
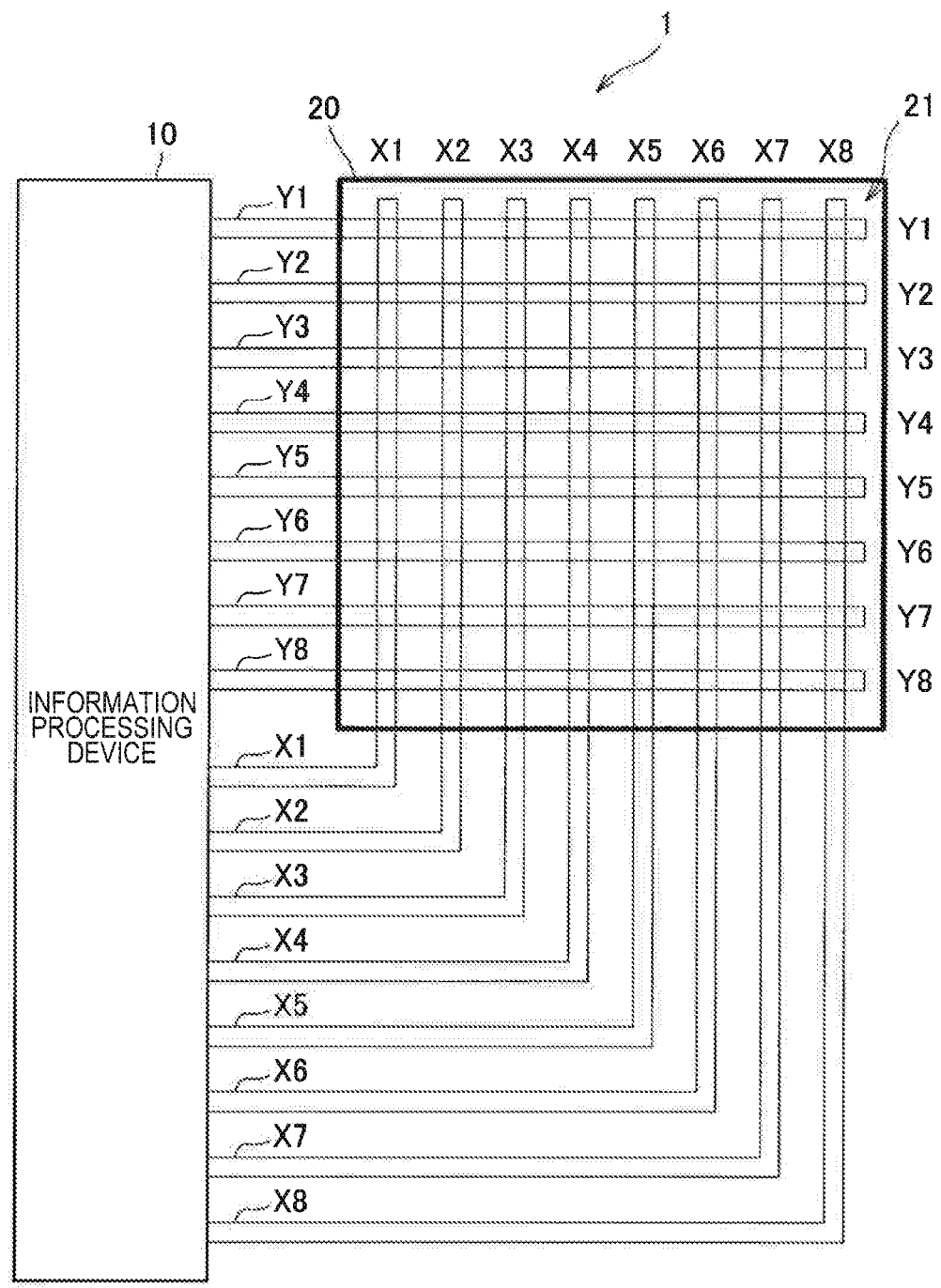
FIG. 1 is a diagram illustrating a configuration example of an information processing system 1 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets or numerals after the same reference sign. However, when there is no need in particular to distinguish structural elements that have substantially the same function and structure, the same reference sign alone is attached.

Hereinafter, the description will be made in the following order.
1. Embodiment of the Present Disclosure
1.1. System Configuration Example
1.2. Detailed Functions
2. Conclusion <1. Embodiment of the Present Disclosure>
[1.1. System Configuration Example]

First, a configuration example of an information processing system according to an embodiment of the present disclosure will be described with reference to the drawings. FIG. 1 is a diagram illustrating a configuration example of an information processing system according to an embodiment of the present disclosure. As illustrated in FIG. 1, an information processing system 1 according to an embodiment of the present disclosure includes an information processing device 10. Further, the information processing system 1 includes a tablet 20 that detects an input device (which will also be referred to simply as "pen.") such as a stylus pen.

The tablet 20 has an indication surface 21 on which indication is imparted with the pen. Further, the tablet 20 includes sensor coils disposed in a matrix in the indication surface 21. The tablet 20 includes sensor coils X1 to X8 corresponding to coordinates X1 to X8 in the row direction, and sensor coils Y1 to Y8 corresponding to coordinates Y1 to Y8 in the column direction in the present embodiment.

Further, the information processing system 1 includes the information processing device 10 connected to the sensor coils X1 to X8 and Y1 to Y8. The information processing device 10 can be configured, for example, as a module obtained by implementing a large scale integration (LSI) and a predetermined circuit on a common circuit board.

Figure 2:
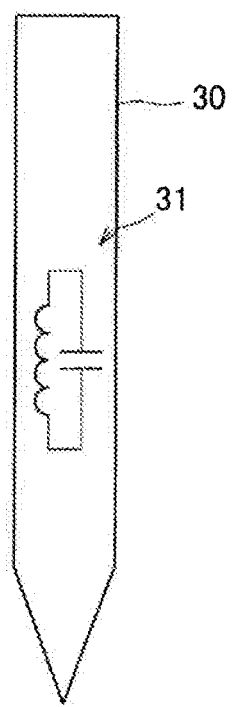
FIG. 2 is a diagram illustrating a configuration example of a pen with which a position is specified on a tablet.

FIG. 2 is a diagram illustrating a configuration example of a pen with which a position is specified on the tablet 20. The electromagnetic induction type is used as the scheme of communication between the tablet 20 and the pen 30 in an embodiment of the present disclosure. As illustrated in FIG. 2, the pen 30 thus includes a resonant circuit 31 including a coil and a capacitor.

[1.2. Detailed Function]

Figure 3:
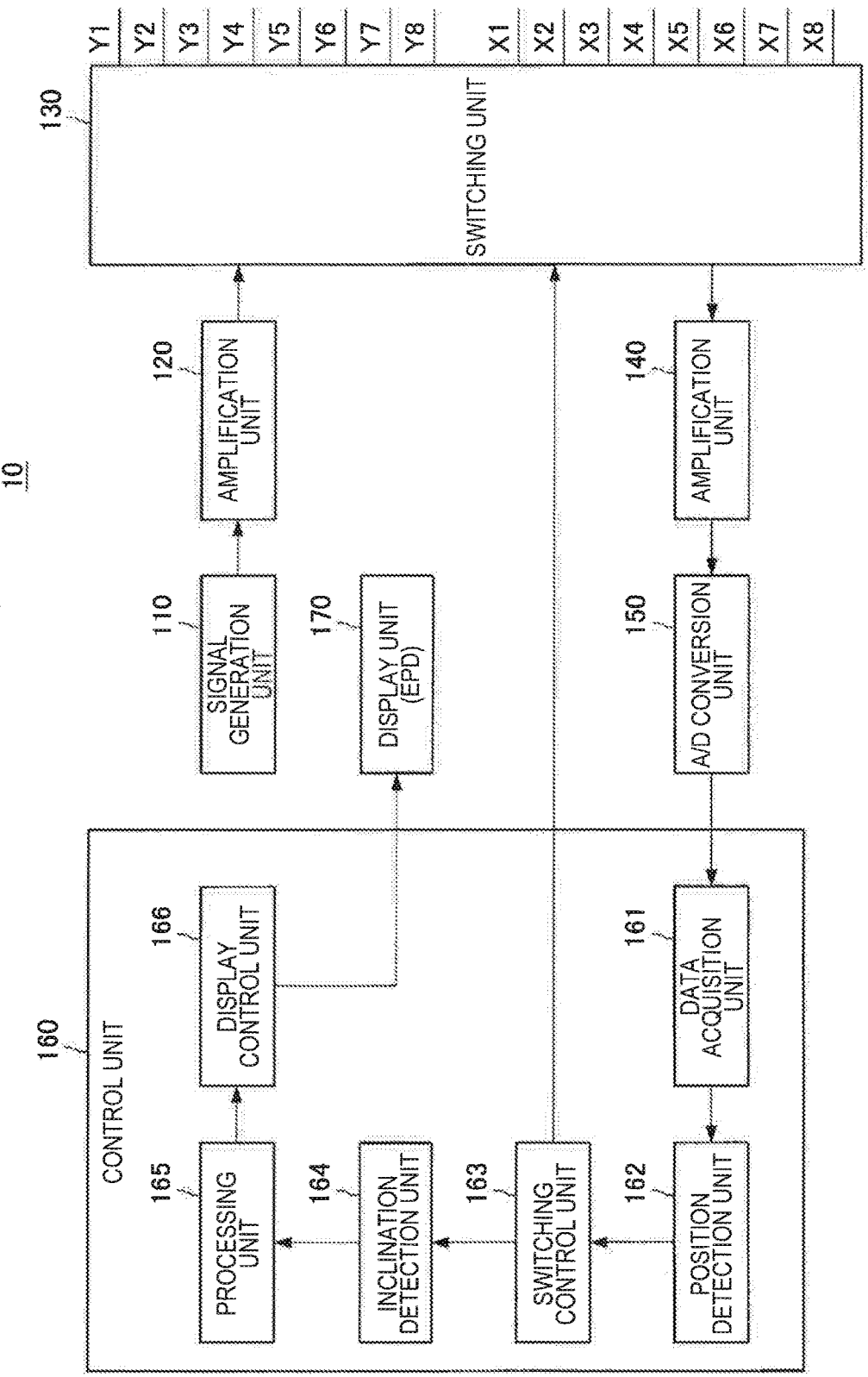
FIG. 3 is a block diagram illustrating a functional configuration example of an information processing device.

FIG. 3 is a block diagram illustrating a functional configuration example of the information processing device 10. As illustrated in FIG. 3, the information processing device 10 includes a signal generation unit 110, an amplification unit 120, a switching unit 130, an amplification unit 140, an analog to digital converter (A/D converter) 150, a control unit 160 serving as an LSI, and a display unit 170. The control unit 160 includes a data acquisition unit 161, a position detection unit 162, a switching control unit 163, an inclination detection unit 164, a processing unit 165, and a display control unit 166.

The following describes the operation of the information processing system 1 according to the present embodiment. First, the signal generation unit 110 generates a signal of the frequency corresponding to the resonance frequency of the resonant circuit 31 of the pen 30 as a supply signal for the tablet 20. The signal generated by the signal generation unit 110 is input to the amplification unit 120. The amplification unit 120 amplifies the supply signal generated by the signal generation unit 110, and the amplified supply signal is then input to the switching unit 130.

The switching unit 130 selects the sensor coils X1 to X8 and Y1 to Y8 in sequence one by one on the basis of switching signals input from the switching control unit 163. It is assumed that the switching unit 130 selects a sensor coil Xk. This supplies a supply signal to the sensor coil Xk, and an alternating field is generated around the sensor coil Xk. That is, a transmission signal of the frequency corresponding to the resonance frequency of the resonant circuit 31 is output from the sensor coil Xk toward the pen 30.

If the pen 30 is in contact with or positioned close to the sensor coil X1 at this time, electromagnetic induction causes an electric current to flow through the resonant circuit 31 of the pen 30. This accumulates energy in the capacitor of the resonant circuit 31. Afterward, the supply of a supply signal is stopped with the sensor coil X1 selected. The energy accumulated in the capacitor of the resonant circuit 31 then causes an electric current to flow through the coil of the resonant circuit 31. This generates an alternating filed around the pen 30. That is, a transmission signal of the frequency corresponding to the resonance frequency of the resonant circuit 31 is output from the pen 30 toward the sensor coil Xk.

Electromagnetic induction then causes an electric current to flow through the sensor coil Xk, thereby generating voltage between the terminals of the sensor coil Xk. That is, a transmission signal transmitted from the pen 30 is received by the sensor coil Xk. This generates the voltage of the frequency corresponding to the resonance frequency of the resonant circuit 31 between the terminals of the sensor coil Xk. In contrast, if the pen 30 is not in contact with or positioned close to the sensor coil X1, no voltage is generated between the terminals of the sensor coil Xk.

The output value or gain of the sensor coil Xk may be input to the amplification unit 140 from the switching unit 130, amplified by the amplification unit 140, and converted into the digital format by the A/D conversion unit 150. The amplified output value or gain is input to the data acquisition unit 161. The data acquisition unit 161 then acquires the output value or gain of the sensor coil Xk. In this way, the output values or gains of the respective sensor coils X1 to X8 (first sensor group) and Y1 to Y8 (second sensor group) are acquired in sequence as detection data.

The position detection unit 162 decides, from the sensor coils X1 to X8, a sensor which the pen 30 comes into contact with or approaches, as a first sensor (which will also be referred to simply as "sensor in an X direction.") specified with the pen 30, and decides, from the sensor coils Y1 to Y8, a sensor which the pen 30 comes into contact with or approach, as a second sensor (which will also be referred to simply as "sensor in a Y direction.") specified with the pen 30.

More specifically, the position detection unit 162 calculates the maximum value of the output value or the maximum value of the gain for each of the sensor coils X1 to X8, and detects the sensor coil the maximum value of which peaks, as a sensor (X coordinate) in the X direction which is input with the pen 30. Similarly, the position detection unit 162 calculates the maximum value of the output value or the maximum value of the gain for each of the sensor coils Y1 to Y8, and detects the sensor coil the maximum value of which peaks, as a sensor (Y coordinate) in the Y direction which is input with the pen 30.

Figure 4:
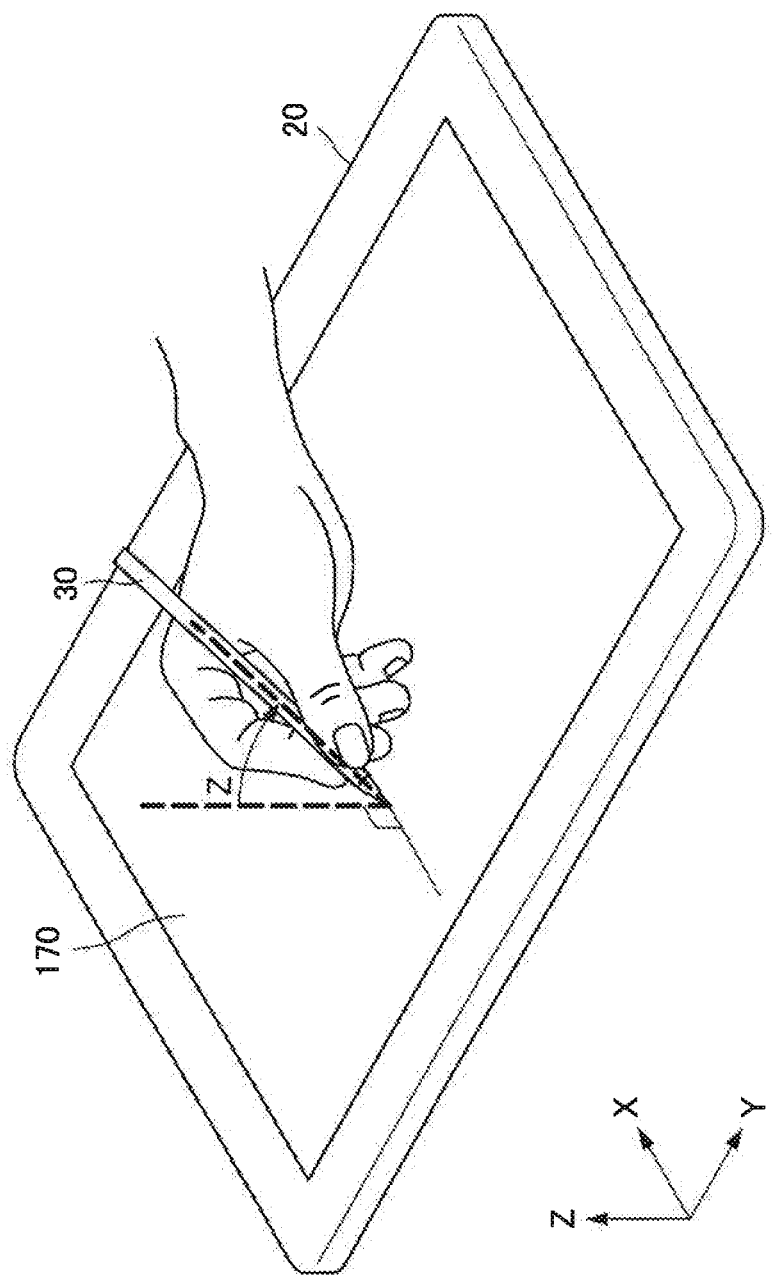
FIG. 4 is a diagram for describing an example of inclination of a pen.

The inclination detection unit 164 detects the inclination of the pen 30 on the basis of the output values or gains of the respective sensors in the X direction and the Y direction. Here, an example of the inclination of the pen 30 will be described. FIG. 4 is a diagram for describing an example of the inclination of the pen 30. As illustrated in FIG. 4, in a case where the perpendicular direction of the display unit 170 (indication surface 21) is represented as a Z axis, the inclination of the pen 30 can include the angle formed between the Z axis with the pen 30. However, the inclination of the pen 30 described herein chiefly includes the angle illustrated in FIG. 5.

Figure 5:
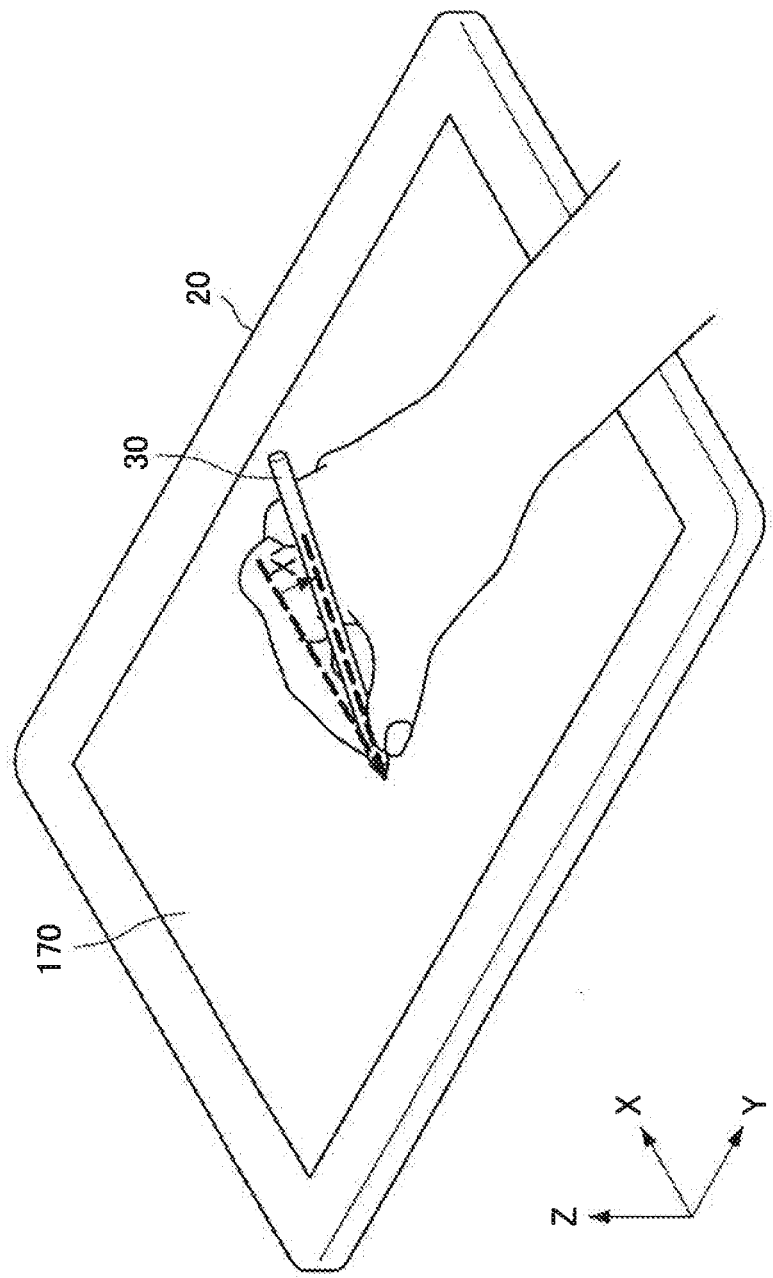
FIG. 5 is a diagram for describing another example of the inclination of the pen.

FIG. 5 is a diagram for describing another example of the inclination of the pen 30. FIG. 5 illustrates that the directions of the sensor X1 to the sensor X8 are represented with an X axis, and the directions of the sensor Y1 to the sensor Y8 are represented with a Y axis. As illustrated in FIG. 5, inclination XY of the pen 30 may be then the angle formed between the plane orthogonal to the Y axis and the pen 30. The inclination XY will be thus used chiefly as the inclination of the pen 30 in the following description. Additionally, the inclination XY of the pen 30 may also be the angle formed between the plane orthogonal to the X axis and the pen 30.

Figure 6:
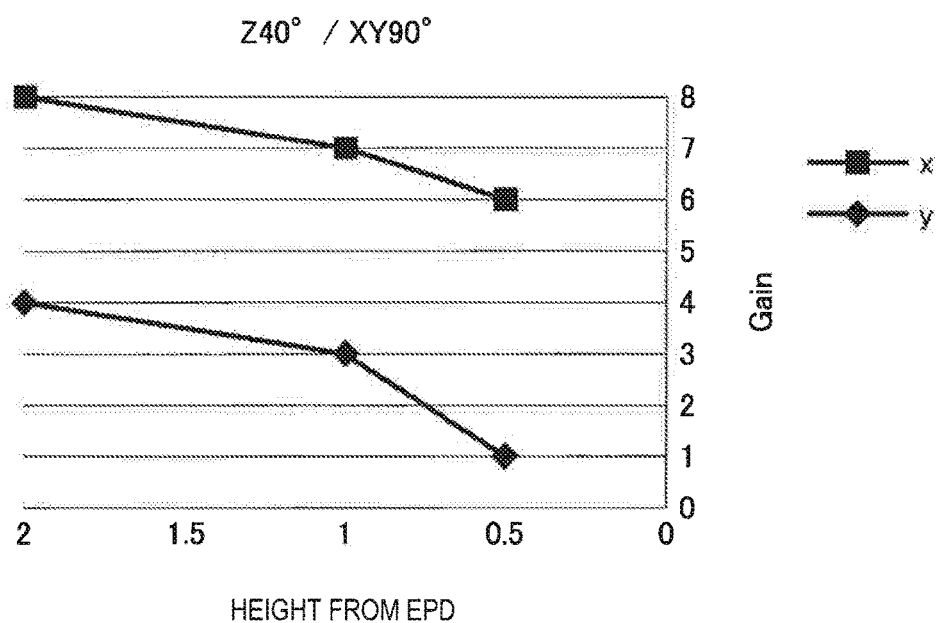
FIG. 6 is a diagram illustrating an example of a relationship between gains of respective sensors in an X direction and a Y direction and inclination XY of a pen

The relationship between the output values or gains of the respective sensors in the X direction and the Y direction and the inclination XY of the pen 30 will be described. FIG. 6 is a diagram illustrating an example of the relationship between the gains of respective sensors in the X direction and the Y direction and the inclination XY of the pen 30. FIG. 6 illustrates a result obtained by measuring how the gains of the respective sensors in the X direction and the Y direction change in accordance with the height from an electrophoretic display (EPD) serving as an example of the display unit 170 in a case where inclination Z of the pen 30 is "40°" and the inclination XY of the pen 30 is "90°."

Figure 7:
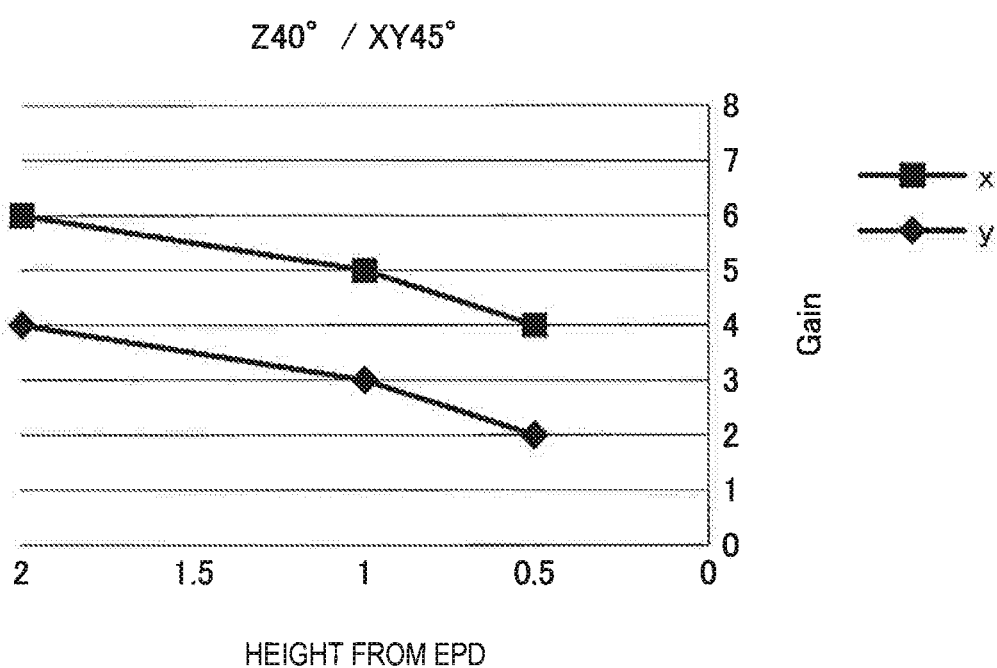
FIG. 7 is a diagram illustrating another example of the relationship between the gains of the respective sensors in the X direction and the Y direction and the inclination XY of the pen.

FIG. 7 is a diagram illustrating another example of the relationship between the gains of the respective sensors in the X direction and the Y direction and the inclination XY of the pen 30. FIG. 7 illustrates a result obtained by measuring how the gains of the respective sensors in the X direction and the Y direction change in accordance with the height from an EPD serving as an example of the display unit 170 in a case where inclination Z of the pen 30 is "40°" and the inclination XY of the pen 30 is "45°."

Figure 8:
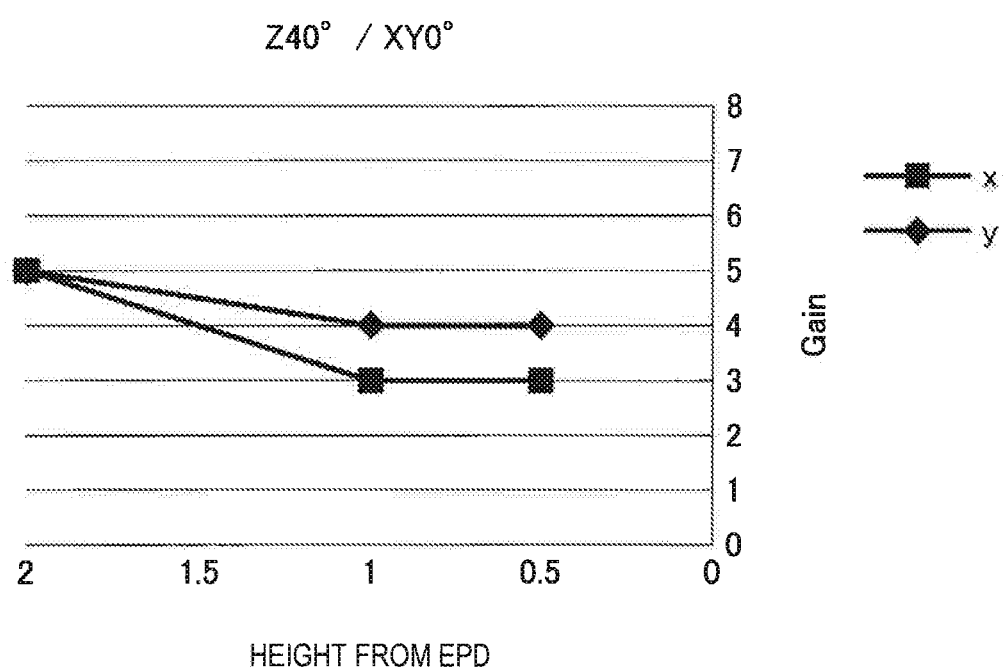
FIG. 8 is a diagram illustrating another example of a relationship between the gains of the respective sensors in the X direction and the Y direction and the inclination XY of a pen 30.

FIG. 8 is a diagram illustrating another example of the relationship between the gains of the respective sensors in the X direction and the Y direction and the inclination XY of the pen 30. FIG. 8 illustrates a result obtained by measuring how the gains of the respective sensors in the X direction and the Y direction change in accordance with the height from an EPD serving as an example of the display unit 170 in a case where inclination Z of the pen 30 is "40°" and the inclination XY of the pen 30 is "0°."

It is known from the various examples illustrated in FIGS. 6 to 8 that the inclination XY of the pen 30 is dependent on the difference value between the gains of respective sensors in the X direction and the Y direction. More specifically, FIGS. 6 to 8 illustrate that if the inclination Z of the pen 30 is the same, the value obtained by subtracting the gain of a sensor in the Y direction from the gain of a sensor in the X direction increases with an increase in the inclination XY of the pen 30. The inclination detection unit 164 then detects the inclination of the pen 30 on the basis of the difference value between the detection data the sensor in the X direction and the detection data of the sensor in the Y direction.

There is no need to incorporate a sensor into the pen 30 for detecting the inclination of the pen 30 in this configuration. It is therefore possible to prevent the pen 30 from increasing in size. Further, no complicated operation is required for detecting the inclination of the pen 30 in this configuration. It is therefore possible to detect the inclination of the pen 30 through a simple operation.

Figure 9:
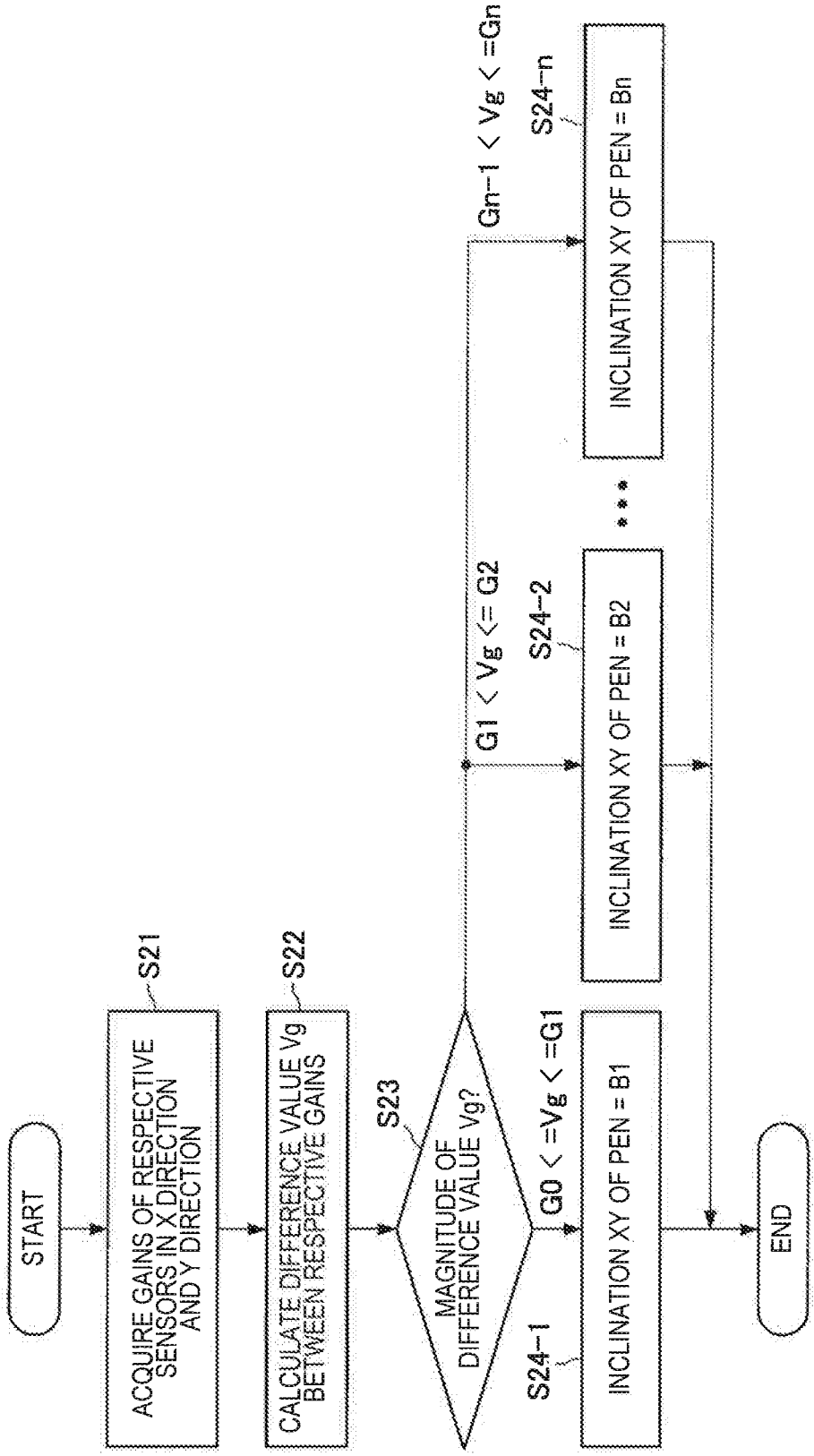
FIG. 9 is a flowchart illustrating an example of an operation of detecting the inclination XY of the pen on the basis of a difference value between gains of respective sensors in the X direction and the Y direction.

Next, an operation will be described of detecting the inclination XY of the pen 30 on the basis of the difference value between the gains of respective sensors in the X direction and the Y direction. FIG. 9 is a flowchart illustrating an example of an operation of detecting the inclination XY of the pen 30 on the basis of the difference value between the gains of respective sensors in the X direction and the Y direction. As illustrated in FIG. 9, the data acquisition unit 161 acquires the gains of the respective sensors in the X direction and the Y direction (S21).

Next, the inclination detection unit 164 calculates a difference value Vg between the gains of sensors in the X direction and the Y direction (S22). In a case where the magnitude of the difference value Vg satisfies "G0<=Vg<=G1," the inclination detection unit 164 detects "B1" as the inclination XY of the pen 30 (S24-1) and terminates the operation. In contrast, in a case where the magnitude of the difference value Vg satisfies "G1<Vg<=G2," the inclination detection unit 164 detects "B2" as the inclination XY of the pen 30 (S24-2) and terminates the operation.

Further, in a case where the magnitude of the difference value Vg satisfies "G1<Vg<=Gn," the inclination detection unit 164 detects "Bn" as the inclination XY of the pen 30 (S24-n) and terminates the operation. In this way, in a case where the difference value Vg between the gain of a sensor in the X direction and the gain of a sensor in the Y direction falls within a predetermined range, the inclination detection unit 164 can detect, as the inclination of the pen 30, predetermined inclination associated in advance with the predetermined range.

Additionally, if the gain of a sensor in the X direction and the gain of a sensor in the Y direction are excessively large, there is the risk that it is not possible to obtain the difference value between the gains on a certain level or higher. The inclination detection unit 164 may then detect the inclination XY of the pen 30 in a case where the gain of at least any one of the sensor in the X direction and the sensor in the Y direction exceeds a predetermined threshold. This is expected to offer the difference value between the gains on a certain level or higher if the predetermined threshold is appropriately set.

Figure 10:
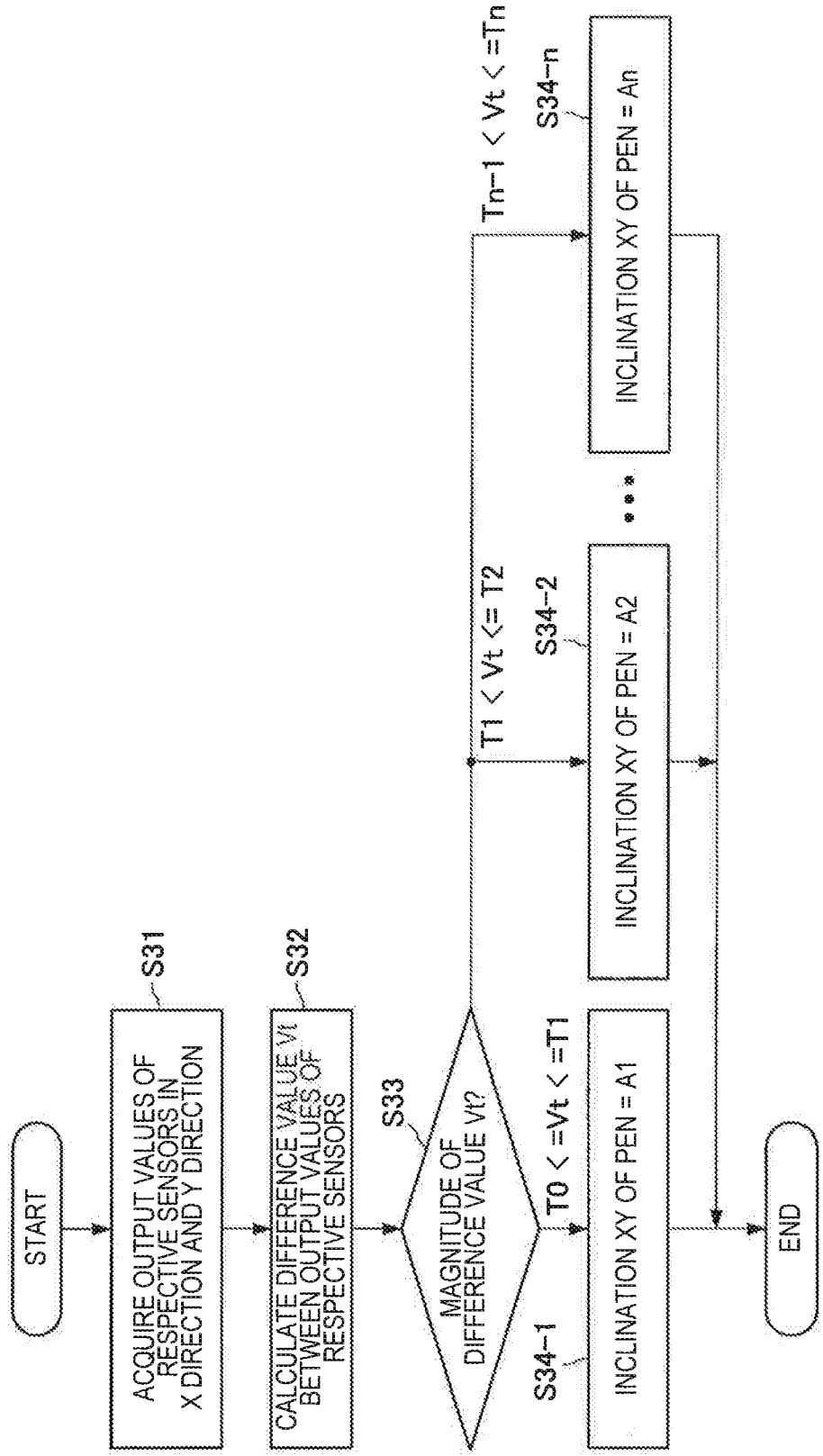
FIG. 10 is a flowchart illustrating an example of an operation of detecting the inclination XY of a pen on the basis of a difference value between output values of respective sensors in the X direction and the Y direction.

Next, an operation will be described of detecting the inclination XY of the pen 30 on the basis of the difference value between the output values of respective sensors in the X direction and the Y direction. FIG. 10 is a flowchart illustrating an example of an operation of detecting the inclination XY of the pen 30 on the basis of the difference value between the output values of respective sensors in the X direction and the Y direction. As illustrated in FIG. 10, the data acquisition unit 161 acquires the output values of the respective sensors in the X direction and the Y direction (S31).

Next, the inclination detection unit 164 calculates a difference value Vt between the output values of sensors in the X direction and the Y direction (S32). In a case where the magnitude of the difference value Vt satisfies "T0<=Vt<=T1," the inclination detection unit 164 detects "A1" as the inclination XY of the pen 30 (S34-1) and terminates the operation. In contrast, in a case where the magnitude of the difference value Vt satisfies "T1<Vt<=T2," the inclination detection unit 164 detects "A2" as the inclination XY of the pen 30 (S34-2) and terminates the operation.

Further, in a case where the magnitude of the difference value Vt satisfies "Tn−1<Vt<=Tn," the inclination detection unit 164 detects "An" as the inclination XY of the pen 30 (S34-n) and terminates the operation. In this way, in a case where the difference value Vt between the detection data of a sensor in the X direction and the detection data of a sensor in the Y direction (output values in the example of FIG. 10) falls within a predetermined range, the inclination detection unit 164 can detect, as the inclination of the pen 30, predetermined inclination associated in advance with the predetermined range.

Additionally, if the output value of a sensor in the X direction and the output value of a sensor in the Y direction are excessively large, there is the risk that it is not possible to obtain the difference value between the gains on a certain level or higher. The inclination detection unit 164 may then detect the inclination XY of the pen 30 in a case where the output value of at least any one of the sensor in the X direction and the sensor in the Y direction exceeds a predetermined threshold. This is expected to offer the difference value between the gains on a certain level or higher if the predetermined threshold is appropriately set.

If the position detection unit 162 detects a sensor in the X direction and a sensor in the Y direction, the display control unit 166 controls the display unit 170 to perform display at the display position corresponding to the crossing position of the sensor in the X direction and the sensor in the Y direction. This performs display at the position specified with the pen 30. Here, the inclination XY of the pen 30 which is detected in the above-described example may be used by the processing unit 165. In this case, the processing unit 165 may execute the predetermined processing corresponding to the inclination XY of the pen 30.

The predetermined processing executed by the processing unit 165 is not limited in particular. For example, there is the probability that a position that a user would like to specify with the pen 30 deviates from a position that is actually detected by the position detection unit 162. It is, however, assumed that this deviation amount is dependent on the inclination XY of the pen 30. The processing unit 165 should thus correct a display position for the display unit 170 by a predetermined correction amount in accordance with the inclination XY of the pen 30.

Figure 11:
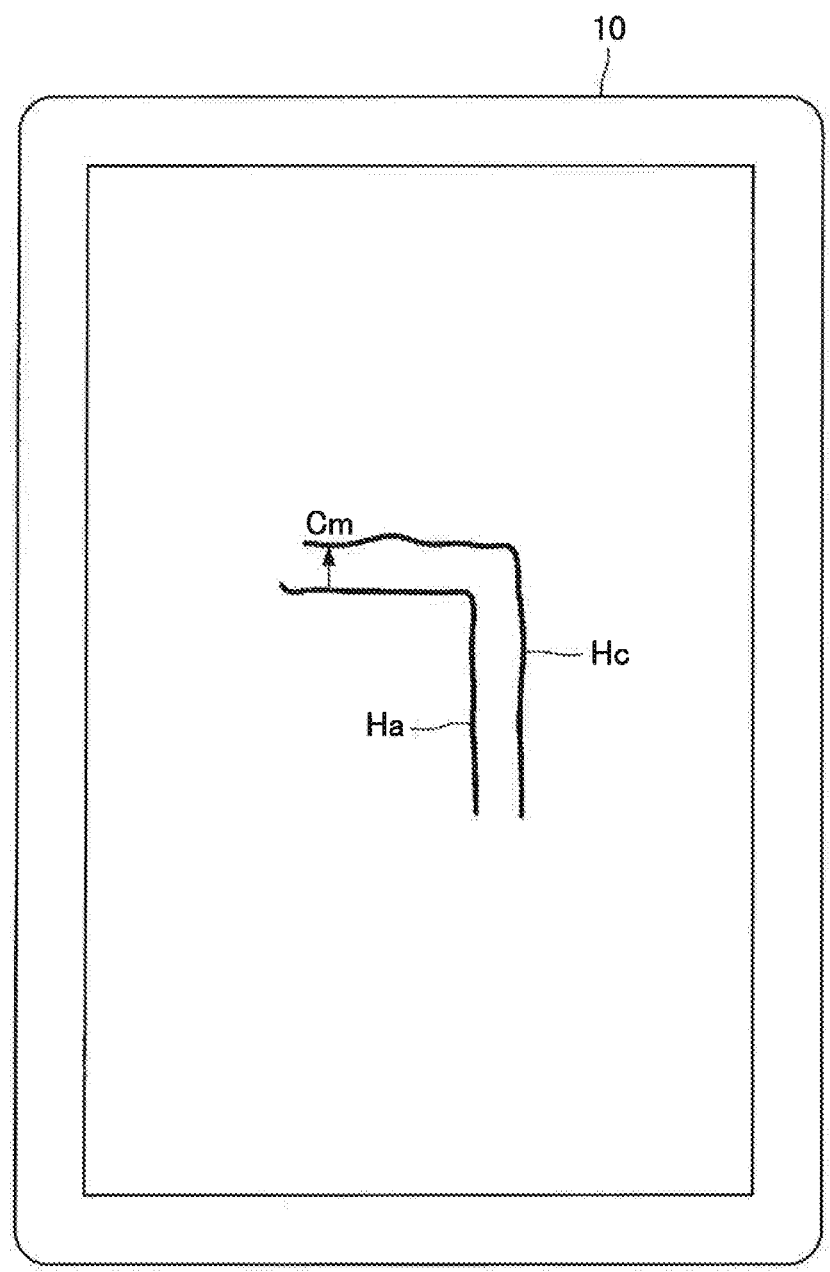
FIG. 11 is a diagram illustrating an example of display position trajectories before and after correction.

FIG. 11 is a diagram illustrating an example of display position trajectories before and after correction. A trajectory Ha before correction represents a display position trajectory that has not yet been corrected by the processing unit 165. Further, a trajectory He after correction represents a display position trajectory that has been corrected by the processing unit 165 by a predetermined correction amount Cm. The use of the inclination XY of the pen 30 can allow the processing unit 165 to appropriately correct a display position for the display unit 170 like this example.

Additionally, the correction amount may be always constant, or vary depending on the situations. For example, in a case where the inclination XY falls within a predetermined range, the processing unit 165 may correct a display position by a predetermined correction amount associated in advance with the predetermined range. A condition for correcting a display position may be then further limited. For example, in a case where at least any one of the detection data of a sensor in the X and the detection data of a sensor in the Y direction satisfies a predetermined condition, and in a case where the inclination XY of the pen 30 falls within a predetermined range, the processing unit 165 may correct a display position by a predetermined correction amount.

More specifically, FIG. 6 illustrates that the gain of a sensor in the Y direction is smaller than "6." The processing unit 165 may thus correct a display position by a predetermined correction amount in a case where the gain of a sensor in the Y direction is smaller than "6," and in a case where the inclination XY of the pen 30 falls within a predetermined range. In a case where this condition is not satisfied, the display position does not have to be corrected.

Alternatively, FIG. 7 illustrates that the gains of respective sensors in the X direction and the Y direction are both larger than "2." The processing unit 165 may thus correct a display position by a predetermined correction amount in a case where the gains of respective sensors in the X direction and the Y direction are both larger than "2," and in a case where the inclination XY of the pen 30 falls within a predetermined range. In a case where this condition is not satisfied, the display position does not have to be corrected.

The above shows the example in which the correction amount is associated in advance with the predetermined range, but the correction amount may also be acquired by another technique. For example, the processing unit 165 may also calculate the correction amount of a display position in accordance with the inclination XY of the pen 30. Algorithm for calculating the correction amount is not also limited in particular. In one example, the processing unit 165 may calculate the correction amount from the inclination XY of the pen 30 on the basis of the relationship that the correction amount linearly changes relative to the inclination XY of the pen 30, on the assumption that the correction amount has such a relationship.

Figure 12:
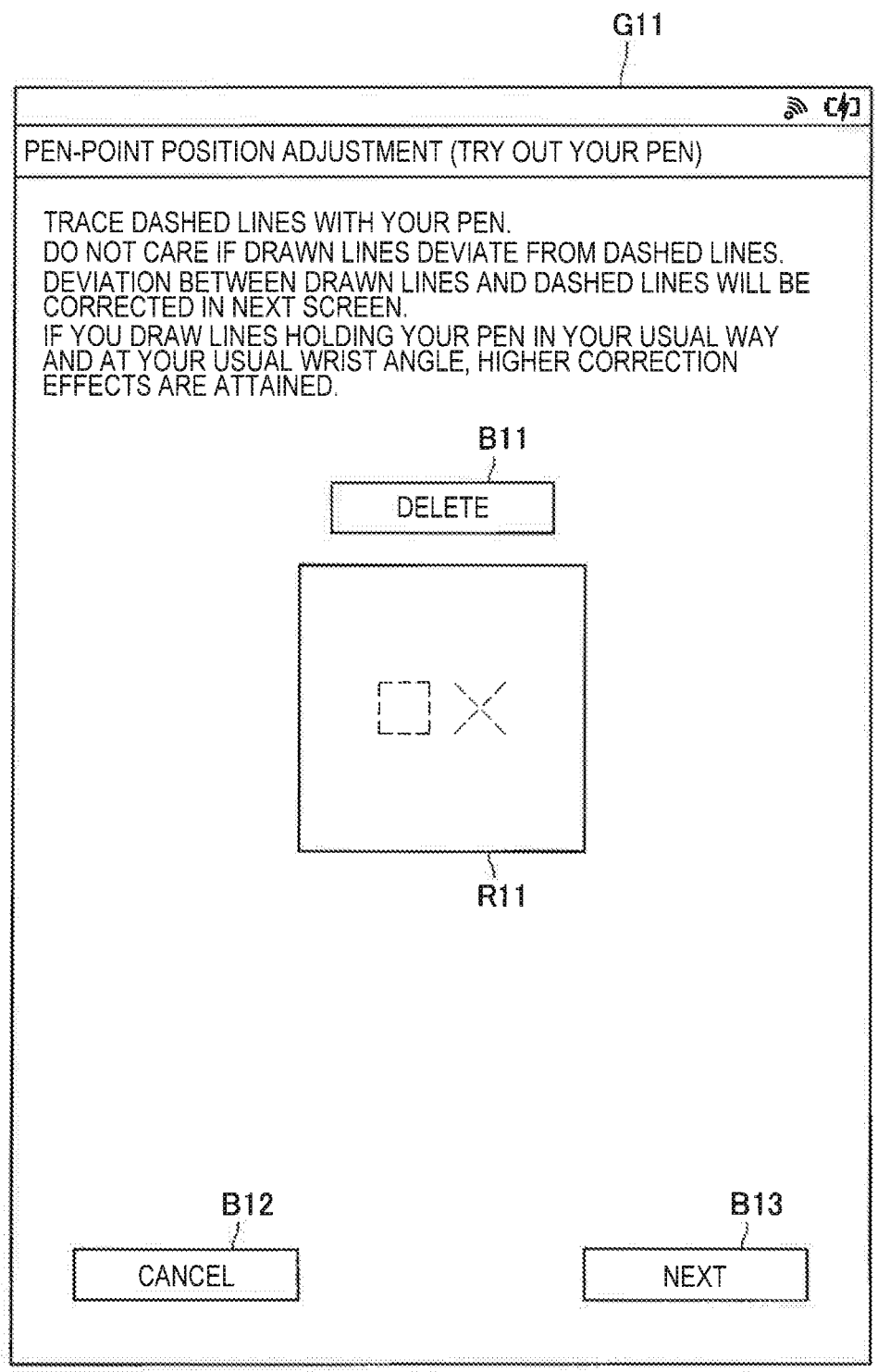
FIG. 12 is a diagram illustrating an example of an initial screen displayed in calibration.

Moreover, the correction amount may be adjusted on the basis of a position indicated by a user. For example, the correction amount may be adjusted on the basis of a position indicated by a user with the pen 30 beforehand (or afterward). The following describes processing of adjusting the correction amount (which will also be referred to as "calibration.") on the basis of a position indicated beforehand. FIG. 12 is a diagram illustrating an example of an initial screen displayed in calibration. As illustrated in FIG. 12, the display control unit 166 can display an initial screen G11 on the display unit 170.

Further, the display control unit 166 displays trajectories (two objects drawn by dotted lines in the example illustrated in FIG. 12) for deciding a correction amount on a region R11 in the initial screen G11. A user indicates positions by tracing these trajectories for deciding a correction amount with the pen 30. Here, the display control unit 166 may display the display position trajectory corresponding to the crossing position of a sensor in the X direction and a sensor in the Y direction which are indicated with the pen 30, but the timing of displaying the display position trajectory is not limited.

Figure 13:
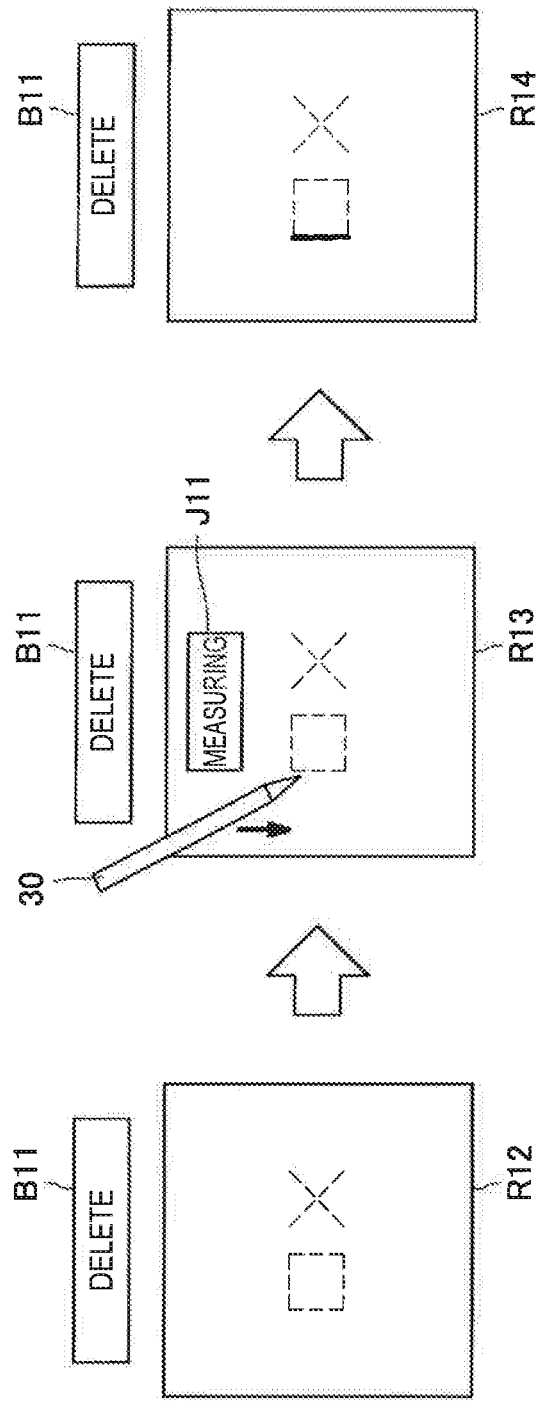
FIG. 13 is a diagram for describing an example of timing of displaying a display position trajectory.

FIG. 13 is a diagram for describing an example of the timing of displaying display position trajectories. FIG. 13 illustrates that the trajectories for deciding a correction amount are displayed on a region R12. Even if the pen 30 is brought into contact with or approached by a sensor in the X direction and a sensor in the Y direction, no display position trajectories should be displayed on the display unit 170. The display control unit 166 displays an object J11 on a region R13 instead of display position trajectories. The object J11 shows that a correction amount is measured.

The display control unit 166 should then begin to display position trajectories on the display unit 170 as shown in a region R14 after the pen 30 is no longer in contact with or positioned close to a sensor in the X direction or a sensor in the Y direction. If the display position trajectories are displayed at such timing, a user does not have to pay attention to how much a position indicated by the user deviates from the trajectories for deciding a correction amount. This makes it possible to more accurately acquire a correction amount.

Figure 14:
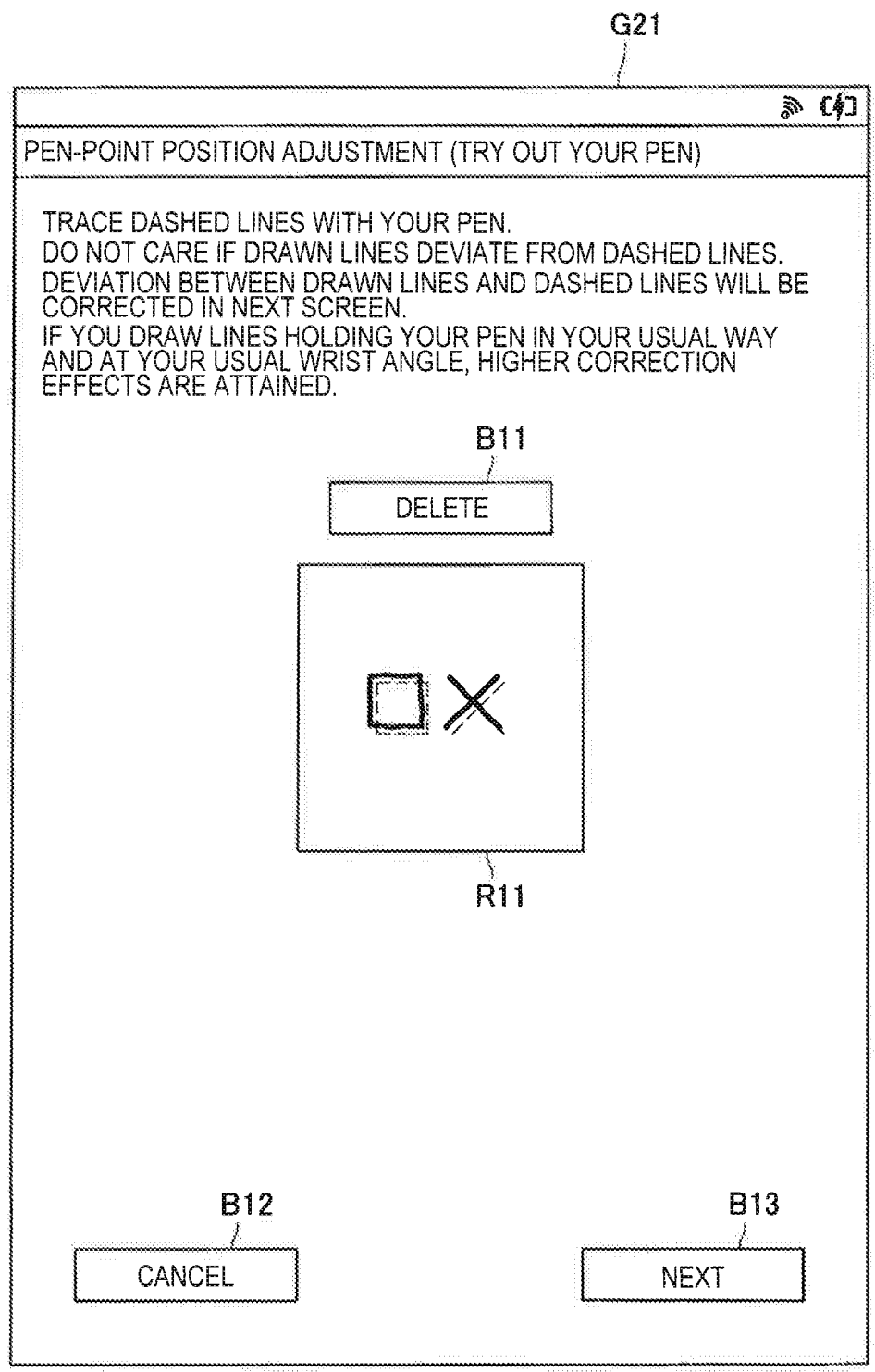
FIG. 14 is a diagram illustrating a display position trajectory at time of finishing tracing a trajectory for deciding a correction amount.

The description will continue with reference to FIG. 12 again. In a case where a delete button B11 is indicated, the display position trajectories may be deleted. Further, in a case where a cancel button B12 is indicated, the display screen may transition to a menu selection screen that is not illustrated. FIG. 14 is a diagram illustrating display position trajectories at the time of finishing tracing the trajectories for deciding a correction amount. FIG. 14 illustrates that the display position trajectories are displayed on a region R11 of a screen G21 at the time of finishing tracing the trajectories for deciding a correction amount.

Figure 15:
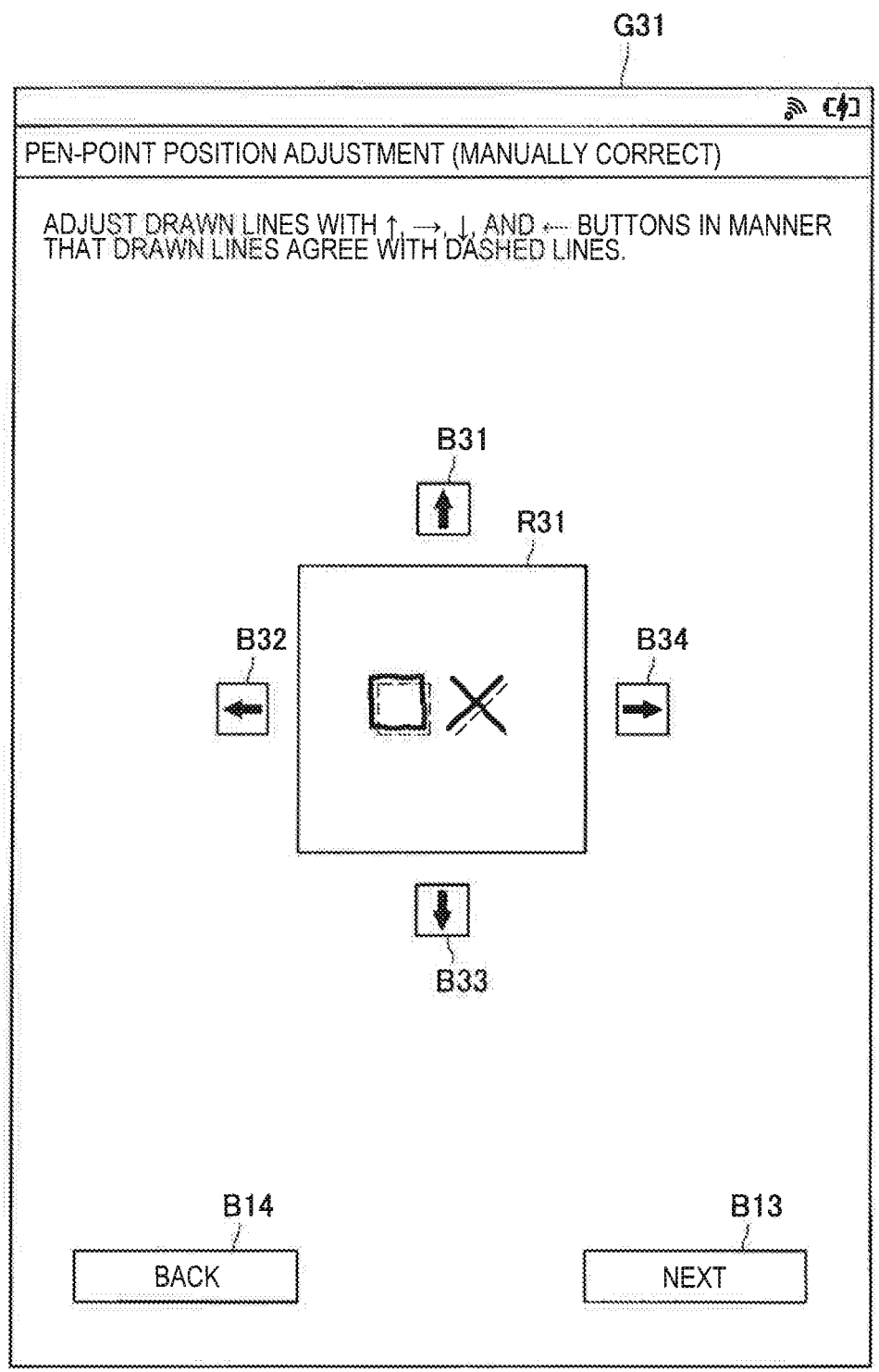
FIG. 15 is a diagram illustrating a screen example for adjusting a display position trajectory through a user operation.

If a next button B13 is indicated in the screen G21, the display screen may transition to the next screen. FIG. 15 is a diagram illustrating a screen example for adjusting display position trajectories through a user operation. If the next button B13 is indicated in the screen G21, the display control unit 166 may display a screen G31. A region R31 is displayed on the screen G31. The region R31 includes the trajectories for deciding a correction amount and display position trajectories. Objects B31 to B34 are then displayed on the screen G31 for moving the display position trajectories.

Figure 16:
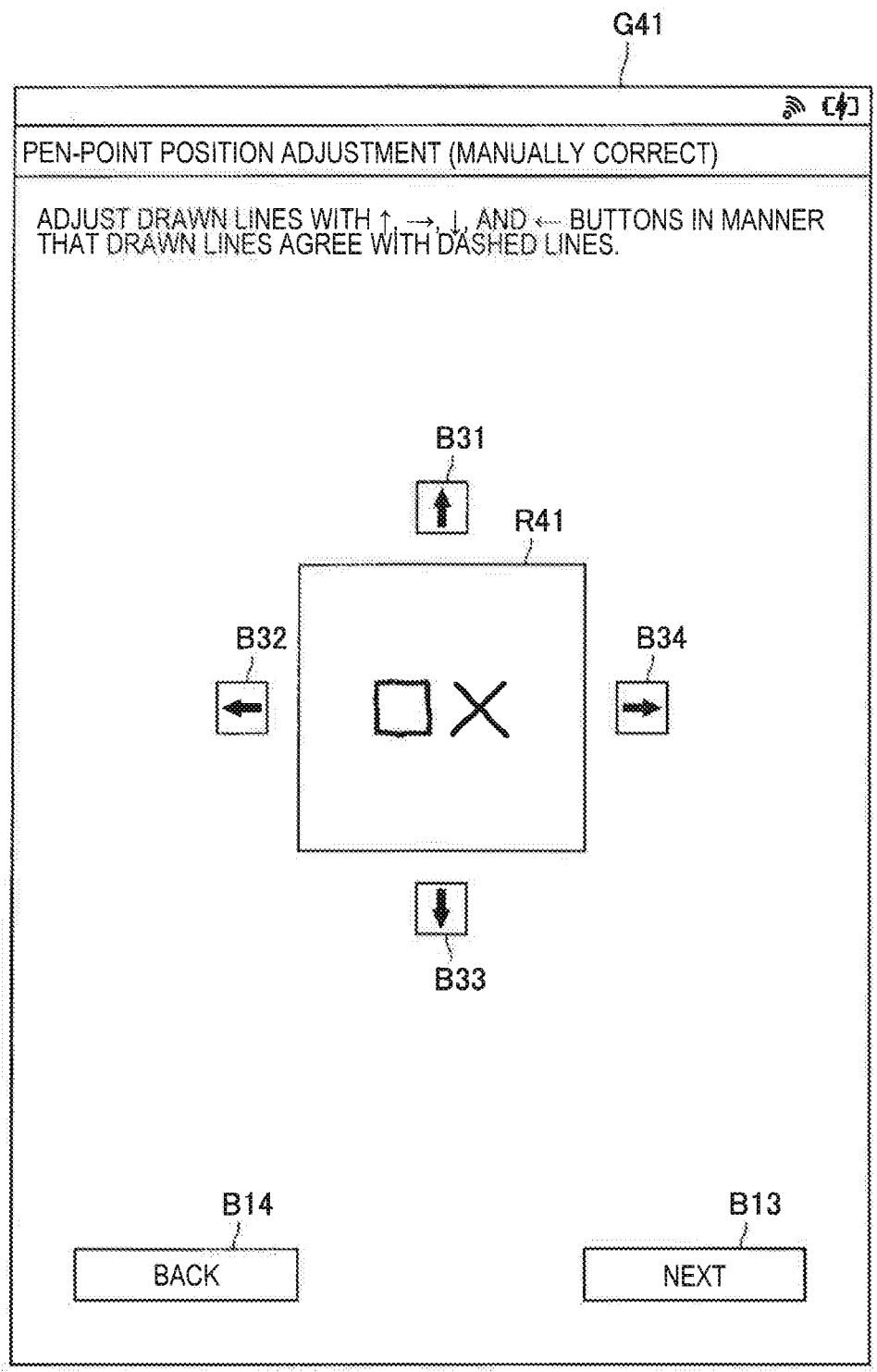
FIG. 16 is a diagram illustrating a display position trajectory at time of finishing movement.

For example, if the objects B31 to B34 are indicated, the display control unit 166 can move the display position trajectories by a predetermined amount in the directions represented by the objects B31 to B34. If a user moves the display position trajectories in a manner that the trajectories for deciding a correction amount agree with the display position trajectories, the processing unit 165 can thus acquire the movement of the display position trajectories as a correction amount. FIG. 16 is a diagram illustrating display position trajectories at the time of finishing movement. FIG. 16 illustrates that the display position trajectories that overlap with the trajectories for deciding a correction amount are displayed on a region R41 of a screen G41 at the time of finishing movement.

Additionally, the example has been here described in which a correction amount is acquired by moving display position trajectories through a user operation, but a technique of acquiring a correction amount is not limited to this example. For example, the processing unit 165 may measure the deviation amount between the trajectories for deciding a correction amount and display position trajectories, and decide a correction amount on the basis of the measured deviation amount. Here, in a case where a back button B14 is indicated, the display screen may transition to a menu selection screen that is not illustrated. Further, if the next button B13 is indicated, the display screen may transition to the next screen.

Figure 17:
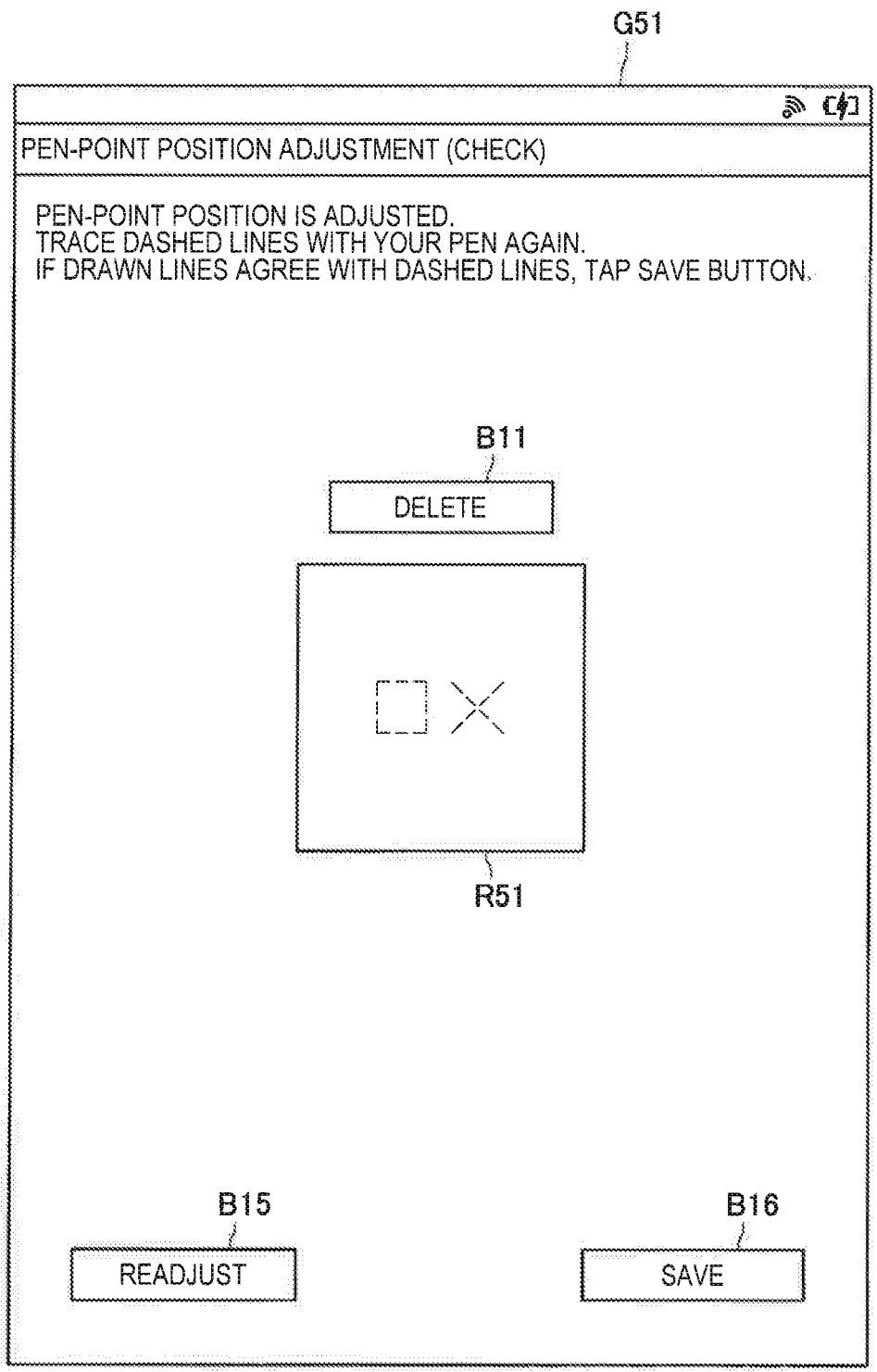
FIG. 17 is a diagram illustrating a screen example for allowing a user to check a display position trajectory.

FIG. 17 is a diagram illustrating a screen example for allowing a user to check display position trajectories. As illustrated in FIG. 17, the display control unit 166 can display a screen G51 that allows a user to check the display position trajectories. The display control unit 166 displays the trajectories for deciding a correction amount on a region R51 in the screen G51. Positions are indicated by tracing these trajectories for deciding a correction amount with the pen 30. In a case where indication is imparted here with the pen 30, the display control unit 166 may display corrected display position trajectories.

In a case where a user who views the corrected display positions feels it necessary to adjust the correction amount again, a readjust button B15 is indicated. In a case where the readjust button B15 is indicated, the display screen may transition to the initial screen G11. FIG. 18 is a diagram illustrating an example of a readjustment screen. As illustrated in FIG. 18, a region R61 is displayed on a screen G61 on a readjust screen G61. The region R61 includes the trajectories for deciding a correction amount and display position trajectories.

In contrast, in a case where a user who views the corrected display positions feels it unnecessary to adjust the correction amount again, a save button B16 is indicated. In a case where the save button B16 is indicated, the correction amount may be saved in a storage unit that is not illustrated. The saved correction amount may be used to correct the display positions. Further, in a case where the save button B16 is indicated, the display screen may transition to a menu selection screen that is not illustrated.

<2. Conclusion>

As described above, according to an embodiment of the present disclosure, the information processing device 10 is provided that includes the data acquisition unit 161 which acquires, as detection data, the output value or gain of each of sensors in the X direction and the Y direction which can detect contact with or approach to the pen 30, and the inclination detection unit 164 which detects the inclination of the pen 30 on the basis of the difference value between the detection data of the sensor in the X direction and the detection data of the sensor in the Y direction. It is possible to detect the inclination of the pen 30 through a simple operation in this configuration while preventing the pen 30 from increasing in size.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above describes the example in which the tablet 20 supplies power to the pen 30, but the pen 30 may also be supplied with power from other than the tablet 20. For example, the pen 30 may operate by using the power supplied from a battery or the like built therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:
a data acquisition unit configured to acquire, as detection data, output values or gains of a first sensor and a second sensor which are each capable of detecting contact with or approach to an input device; and
an inclination detection unit configured to detect inclination of the input device on the basis of a difference value between the detection data of the first sensor and the detection data of the second sensor.

(2)

The information processing device according to (1), in which in a case where the difference value falls within a predetermined range, the inclination detection unit detects predetermined inclination as the inclination of the input device, the predetermined inclination being associated in advance with the predetermined range.

(3)

The information processing device according to (1) or (2), including:

a position detection unit configured to decide, from a first sensor group, a sensor which the input device comes into contact with or approaches, as the first sensor, and decide, from a second sensor group, a sensor which the input device comes into contact with or approaches, as the second sensor.

(4)

The information processing device according to any one of (1) to (3), including:

a display control unit configured to control a display unit to perform display at a display position corresponding to a crossing position of the first sensor and the second sensor.

(5)

The information processing device according to (4), including:

a processing unit configured to execute predetermined processing corresponding to the inclination.

(6)

The information processing device according to (5), in which the processing unit corrects the display position by a predetermined correction amount in accordance with the inclination.

(7)

The information processing device according to (6), in which in a case where the inclination falls within a predetermined range, the processing unit corrects the display position by the predetermined correction amount associated in advance with the predetermined range.

(8)

The information processing device according to (7), in which in a case where at least any one of the detection data of the first sensor and the detection data of the second sensor satisfies a predetermined condition, and in a case where the inclination falls within a predetermined range, the processing unit corrects the display position by the predetermined correction amount.

(9)

The information processing device according to (6), in which the processing unit calculates a correction amount of the display position in accordance with the inclination.

(10)

The information processing device according to any one of (6) to (8), in which the display control unit displays a trajectory for deciding a correction amount on the display unit, and the processing unit measures, in advance, a deviation amount between a display position trajectory corresponding to a crossing position of the first sensor and the second sensor and the trajectory for deciding a correction amount, and decides the correction amount on the basis of the deviation amount.

(11)

The information processing device according to any one of (4) to (10), in which the display control unit begins to display a display position trajectory corresponding to the crossing position on the display unit after the input device is no longer in contact with or positioned close to the first sensor and the second sensor.

(12)

The information processing device according to any one of (1) to (11), in which in a case where the detection data of at least any one of the first sensor and the second sensor exceeds a predetermined threshold, the inclination detection unit detects the inclination.

(13)

The information processing device according to any one of (1) to (12), in which the inclination is an angle formed between a plane orthogonal to a direction of the first sensor or a direction of the second sensor and the input device.

(14)

The information processing device according to (3), in which the position detection unit calculates a maximum value of an output value or a maximum value of a gain for each sensor of the first sensor group, and decides a sensor the maximum value of which peaks as the first sensor, the maximum value of the output value or the maximum value of the gain being obtained as a result of supplying a supply signal of a frequency that is the same as a resonance frequency of a resonant circuit included in the input device.

(15)

The information processing device according to (14), in which the position detection unit calculates the maximum value of the output value or the maximum value of the gain for each second sensor group, and decides a sensor the maximum value of which peaks as the second sensor, the maximum value of the output value or the maximum value of the gain being obtained as the result of supplying the supply signal.

(16)

An information processing method including:

acquiring, as detection data, output values or gains of a first sensor and a second sensor which are each capable of detecting contact with or approach to an input device; and detecting, by a processor, inclination of the input device on the basis of a difference value between the detection data of the first sensor and the detection data of the second sensor.

REFERENCE SIGNS LIST

1 information processing system
10 information processing device
20 tablet
21 indication surface
21 pen
31 resonant circuit
110 signal generation unit
120 amplification unit
130 switching unit
140 amplification unit
150 A/D conversion unit
160 control unit
161 data acquisition unit
162 position detection unit
163 switching control unit 164 detection unit
165 processing unit
166 display control unit
170 display unit

The invention claimed is:

1. An information processing device comprising:
a data acquisition circuit configured to acquire, as detection data, output values or gains of a first sensor and a second sensor which are each capable of detecting contact with or approach to an input device;
an inclination detection circuit configured to detect inclination of the input device on the basis of a difference value between the detection data of the first sensor and the detection data of the second sensor; and
a display control circuit configured to control a display unit to perform display at a display position corresponding to a crossing position of the first sensor and the second sensor, wherein the display control circuit begins to display a display position trajectory corresponding to the crossing position on the display unit after the input device is no longer in contact with or positioned close to the first sensor and the second sensor.

2. The information processing device according to claim 1, wherein
in a case where the difference value falls within a predetermined range, the inclination detection circuit detects predetermined inclination as the inclination of the input device, the predetermined inclination being associated in advance with the predetermined range.

3. The information processing device according to claim 1, comprising:
a position detection circuit configured to decide, from a first sensor group, a sensor which the input device comes into contact with or approaches, as the first sensor, and decide, from a second sensor group, a sensor which the input device comes into contact with or approaches, as the second sensor.

4. The information processing device according to claim 3, wherein
the position detection circuit calculates a maximum value of an output value or a maximum value of a gain for each sensor of the first sensor group, and decides a sensor the maximum value of which peaks as the first sensor, the maximum value of the output value or the maximum value of the gain being obtained as a result of supplying a supply signal of a frequency that is the same as a resonance frequency of a resonant circuit included in the input device.

5. The information processing device according to claim 4, wherein
the position detection circuit calculates the maximum value of the output value or the maximum value of the gain for each second sensor group, and decides a sensor the maximum value of which peaks as the second sensor, the maximum value of the output value or the maximum value of the gain being obtained as the result of supplying the supply signal.

6. The information processing device according to claim 1, comprising:
a processing circuit configured to execute predetermined processing corresponding to the inclination.

7. The information processing device according to claim 6, wherein
the processing circuit corrects the display position by a predetermined correction amount in accordance with the inclination.

8. The information processing device according to claim 7, wherein
in a case where the inclination falls within a predetermined range, the processing circuit corrects the display position by the predetermined correction amount associated in advance with the predetermined range.

9. The information processing device according to claim 8, wherein
in a case where at least any one of the detection data of the first sensor and the detection data of the second sensor satisfies a predetermined condition, and in a case where the inclination falls within a predetermined range, the processing circuit corrects the display position by the predetermined correction amount.

10. The information processing device according to claim 7, wherein
the processing circuit calculates a correction amount of the display position in accordance with the inclination.

11. The information processing device according to claim 7, wherein
the display control circuit displays a trajectory for deciding a correction amount on the display unit, and
the processing circuit measures, in advance, a deviation amount between a display position trajectory corresponding to a crossing position of the first sensor and the second sensor and the trajectory for deciding a correction amount, and decides the correction amount on the basis of the deviation amount.

12. The information processing device according to claim 1, wherein
in a case where the detection data of at least any one of the first sensor and the second sensor exceeds a predetermined threshold, the inclination detection circuit detects the inclination.

13. The information processing device according to claim 1, wherein
the inclination is an angle formed between a plane orthogonal to a direction of the first sensor or a direction of the second sensor and the input device.

14. An information processing method comprising:
acquiring, as detection data, output values or gains of a first sensor and a second sensor which are each capable of detecting contact with or approach to an input device;
detecting, by a processor, inclination of the input device on the basis of a difference value between the detection data of the first sensor and the detection data of the second sensor; and
controlling, by a display control circuit, a display unit to perform display at a display position corresponding to a crossing position of the first sensor and the second sensor, wherein the display control circuit begins to display a display position trajectory corresponding to the crossing position on the display unit after the input device is no longer in contact with or positioned close to the first sensor and the second sensor.

15. An information processing device, comprising:
a data acquisition circuit configured to acquire, as detection data, output values or gains of a first sensor and a second sensor which are each capable of detecting contact with or approach to an input device;
an inclination detection circuit configured to detect inclination of the input device on the basis of a difference value between the detection data of the first sensor and the detection data of the second sensor;

a display control circuit configured to control a display unit to perform display at a display position corresponding to a crossing position of the first sensor and the second sensor; and a processing circuit configured to execute predetermined processing corresponding to the inclination, wherein the processing circuit corrects the display position by a predetermined correction amount in accordance with the inclination, wherein in a case where the inclination falls within a predetermined range, the processing circuit corrects the display position by the predetermined correction amount associated in advance with the predetermined range.

16. The information processing device according to claim 15, wherein in a case where at least any one of the detection data of the first sensor and the detection data of the second sensor satisfies a predetermined condition, and in a case where the inclination falls within a predetermined range, the processing circuit corrects the display position by the predetermined correction amount.

17. An information processing device, comprising:

a data acquisition circuit configured to acquire, as detection data, output values or gains of a first sensor and a second sensor which are each capable of detecting contact with or approach to an input device;

an inclination detection circuit configured to detect inclination of the input device on the basis of a difference value between the detection data of the first sensor and the detection data of the second sensor;

a display control circuit configured to control a display unit to perform display at a display position corresponding to a crossing position of the first sensor and the second sensor; and a processing circuit configured to correct the display position by a predetermined correction amount in accordance with the inclination, wherein the display control circuit displays a trajectory for deciding a correction amount on the display unit, and the processing circuit measures, in advance, a deviation amount between a display position trajectory corresponding to a crossing position of the first sensor and the second sensor and the trajectory for deciding a correction amount, and decides the correction amount on the basis of the deviation amount.

* * * * *